United States Patent [19]

Hajek, II et al.

[11] 4,183,498
[45] Jan. 15, 1980

[54] DRAINING APPARATUS FOR A FLUID RESERVOIR

[75] Inventors: Thomas J. Hajek, II, Joliet; Robert G. Henderson, Morris, both of Ill.

[73] Assignee: Caterpillar Tractor Co., Peoria, Ill.

[21] Appl. No.: 970,407

[22] Filed: Dec. 18, 1978

Related U.S. Application Data

[62] Division of Ser. No. 777,386, Mar. 14, 1977, Pat. No. 4,155,534.

[51] Int. Cl.$^2$ .................................................. F16K 31/58
[52] U.S. Cl. .................................... 251/144; 251/155; 251/353; 137/590; 137/571
[58] Field of Search ................ 251/144, 155, 353; 137/590, 571, 616.5, 801; 285/302

[56] References Cited

U.S. PATENT DOCUMENTS

| | | | |
|---|---|---|---|
| 306,169 | 10/1884 | Moseley | 137/590 X |
| 1,153,823 | 9/1915 | Pierce | 137/616.5 X |
| 1,296,239 | 3/1919 | Van Meter | 251/144 |
| 1,397,220 | 11/1921 | Lord | 137/590 |
| 1,458,718 | 6/1923 | Lord | 137/590 |
| 1,631,548 | 6/1927 | Patnaude | 251/155 |
| 1,859,126 | 5/1932 | Boeuf | 251/353 X |
| 2,192,543 | 3/1940 | Dell | 251/144 X |
| 2,841,314 | 7/1958 | Munson et al. | 251/353 X |
| 2,862,648 | 12/1958 | Cooksley et al. | 251/353 X |
| 3,203,665 | 8/1965 | Grant et al. | 251/353 X |
| 3,203,713 | 8/1965 | Pangburn et al. | 285/302 |
| 3,219,278 | 11/1965 | Santarelli | 251/353 X |

*Primary Examiner*—William R. Cline
*Attorney, Agent, or Firm*—John L. James

[57] ABSTRACT

Draining apparatus is provided for a fluid reservoir having an opening. The apparatus includes a guide housing connected about the reservoir opening and a fluid carrier conduit slidably positioned within the guide housing. The fluid carrier conduit is movable relative to the guide housing from a first nesting position to a second extended position for draining the fluid reservoir.

3 Claims, 4 Drawing Figures

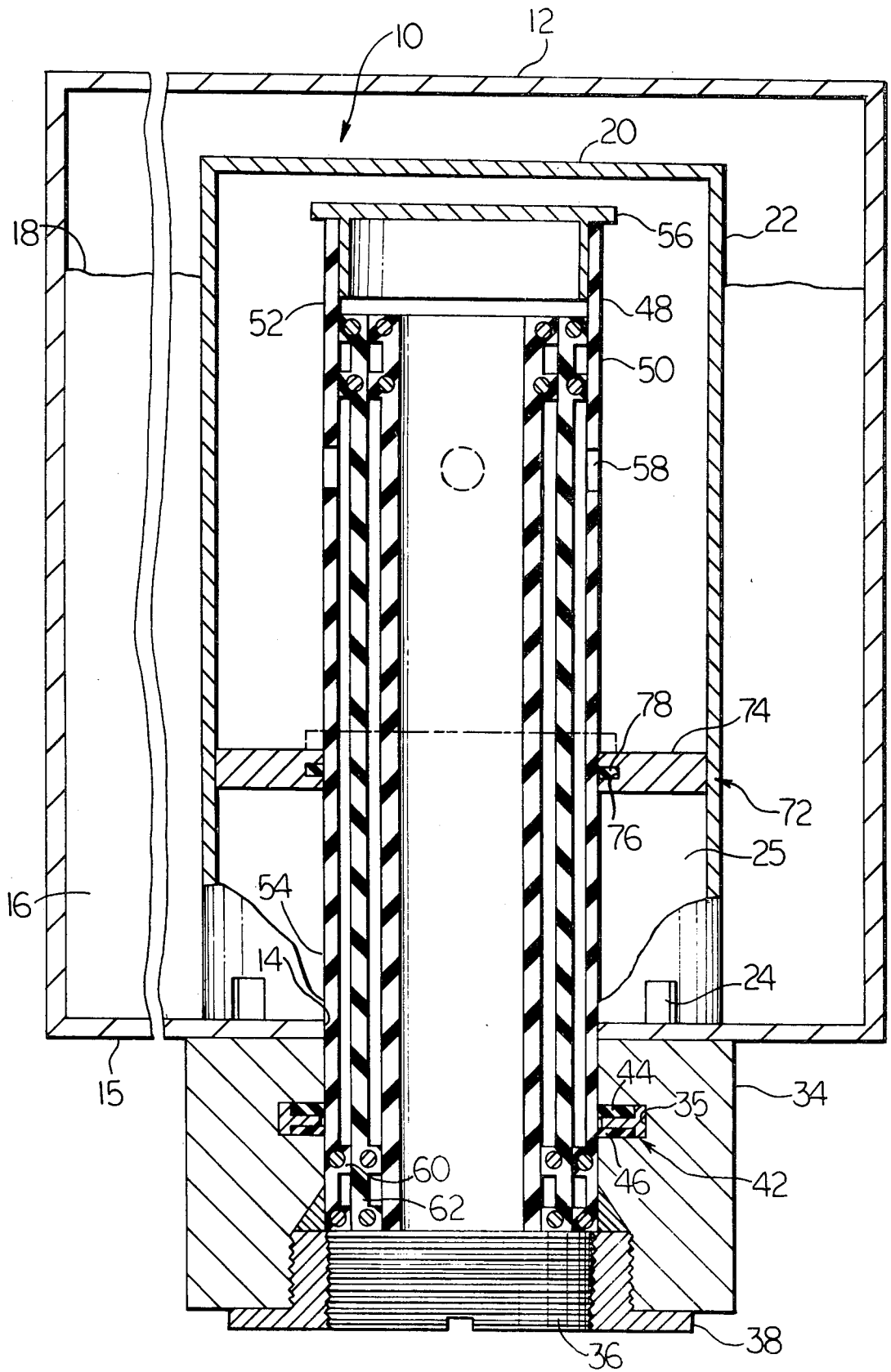

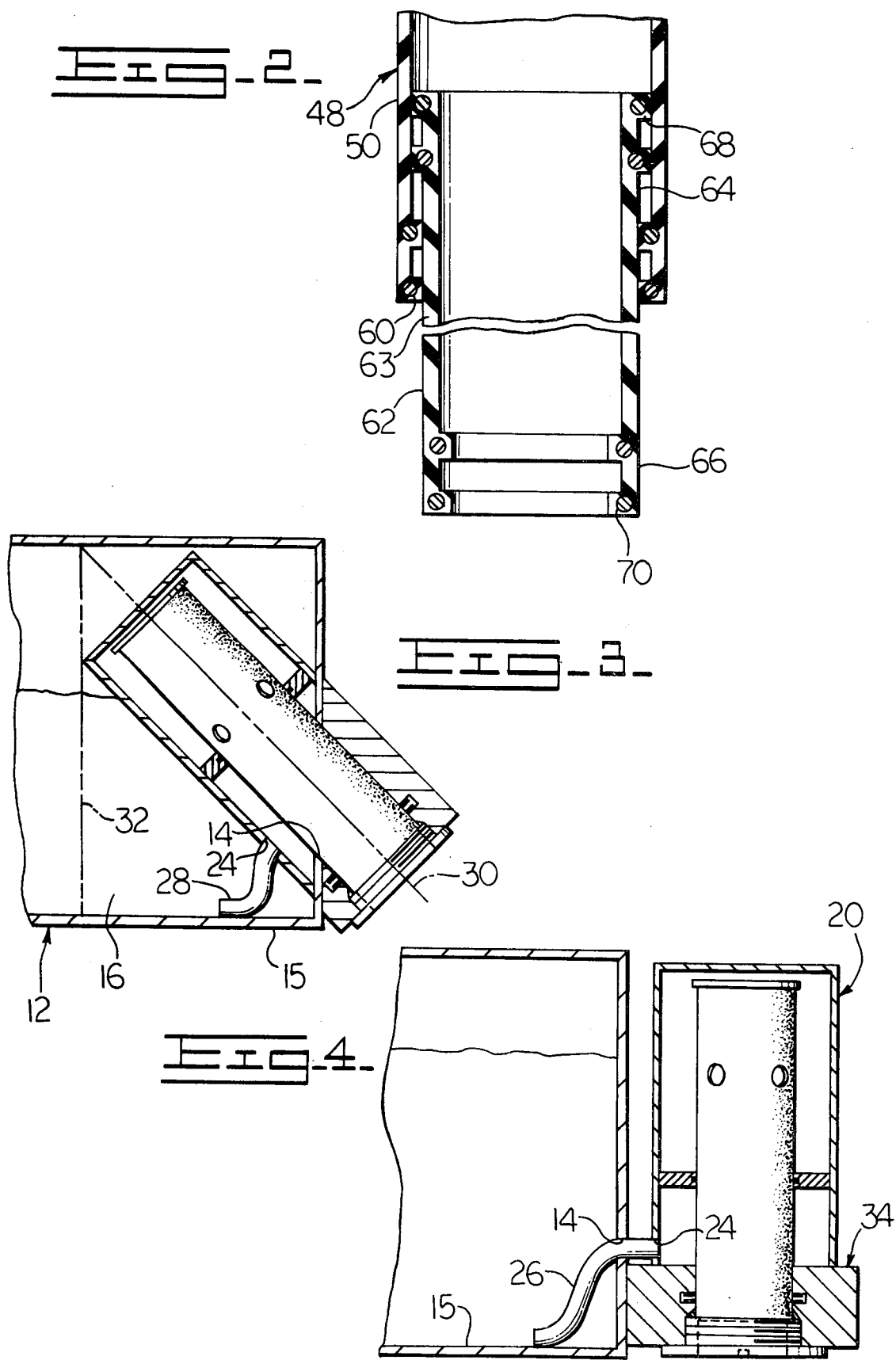

DRAINING APPARATUS FOR A FLUID RESERVOIR

This is a division of Ser. No. 777,386 filed Mar. 14, 1977, now U.S. Pat. No. 4,155,534.

BACKGROUND OF THE INVENTION

Fluid reservoirs are generally equipped with a drain which is used to evacuate a fluid from the fluid reservoir. Because of awkward placement of the drain on earthmoving vehicles, the fluid is allowed to pour from the drain onto the earth or onto components of the vehicle.

Present economic conditions, however, favor the recycling of used hydraulic fluids. Current ecological conditions and standards demand ecological handling and disposal of used hydraulic fluids. These economic and ecological conditions recommend the use of external hoses to direct fluid from the drain to ecological containers for handling and processing. These hoses must be stored until needed and often contaminate the fluid thereby increasing the processing costs. Some hoses are permanently connected to the drain which subjects them to abuse from mud and debris.

Current vehicles, and particularly large earth-moving vehicles, are designed with limited access to the drain which makes connecting the hoses difficult. Routing the hoses around or through the substructure of the vehicles is also a problem.

SUMMARY OF THE INVENTION

The present invention is directed to overcoming one or more of the problems as set forth above.

According to the present invention, a fluid reservoir has a draining apparatus which comprises a guide housing connected about a reservoir opening and having a side opening, and a fluid carrier conduit having a stop element and an opening. The fluid carrier conduit is slidably positioned within the guide housing and movable relative thereto from a first position to a second position.

BRIEF DESCRIPTION OF THE DRAWINGS

FIG. 1 is a vertical, cross-sectional, cutaway view of the present invention;

FIG. 2 is a vertical cross-sectional view of a fluid carrier conduit;

FIG. 3 is a vertical cross-sectional view similar to FIG. 1, but showing another embodiment; and FIG. 4 is a vertical cross-sectional view similar to FIGS. 1 and 3, but showing another embodiment.

DETAILED DESCRIPTION OF THE INVENTION

Referring to FIG. 1, a draining apparatus 10 is connected to a fluid reservoir 12 which has an opening 14, a bottom 15, a chamber 16, for containing a fluid 18. The draining apparatus includes a guide housing 20 connected about the reservoir opening. The guide housing 20 has sidewalls 22 and a side opening 24. An annulus 25 is formed between the guide housing 20 and the carrier conduit 48 and is at a greater elevation than the side opening 24 of the guide housing 20.

Referring to FIG. 4, the side opening 24 of the guide housing 20 is positioned outside the reservoir chamber 16. A duct 26 is positioned in the side opening 24 and extends through the reservoir opening 14 and into the reservoir chamber to a location adjacent the reservoir bottom 15.

Referring to FIG. 3, the side opening 24 of the guide housing 20 is positioned inside the reservoir chamber 16 generally adjacent the bottom 15 of the reservoir 12. A duct 28 is positioned in the side opening and extends to the reservoir bottom. The guide housing has a generally longitudinal axis 30 and is positioned within the reservoir opening 14 and forms an acute angle with a generally vertical axis 32 of the reservoir.

The draining apparatus 10 includes a threaded collar 34 which has an annular groove 35. The collar 34 is connected to the reservoir 12 about the reservoir opening 14, (FIG. 1). The collar can also be connected to the guide housing as shown in FIG. 4. The collar is fitted with a drain plug 36 having threads that are mateable with the threads of the collar 34, (FIG. 1). The collar includes an adapter 38 which is threadably mated with the threads of the drain plug and with the threads of the collar.

The annular groove 35 is fitted with a seal 42 which comprises an upper, radial seal 44 and a lower, wiper seal 46. The seals are constructed of a suitable material, such as rubber or the like.

Referring to FIG. 1, the draining apparatus 10 includes a fluid carrier conduit 48 slidably positioned within the guide housing 20. The carrier conduit has a sidewall 50 extending between first and second end portions, 52 and 54, respectively. A stop element 56 is securely positioned on the first end portion in spaced relation to an opening 58 on the sidewall. The second end of the carrier conduit is connected to the adapter 38, preferably by bonding and has at least one annular internal ridge 60 thereon. The carrier conduit is movable relative to the guide housing between a first nesting position and a second extended position. The stop element is shown in the nesting position in FIG. 1 with the extended position indicated by broken lines. In the nesting position, the guide housing side opening and carrier conduit opening are free from fluid communication. In the extended position, the guide housing side opening and carrier conduit opening are in fluid communication. Where a stop element opening (not shown) replaces the opening on the sidewall of the carrier conduit, then in the extended position the stop element abuts the reservoir bottom.

At least one generally coaxial conduit 62 having a sidewall 63 positioned between first and second end portions 64 and 66, respectively, is slidably positioned inside the sidewalls 50 of the carrier conduit 48. The first end portion of the coaxial conduit has at least one, preferably annular, external ridge 68 and the second end portion has at least one, preferably annular, internal ridge 70. The internal ridge of the first carrier conduit lies in the pathway of the external ridge of the coaxial conduit. Similarly, where there is a plurality of the coaxial conduits slidably positioned inside the guide housing and slidably positioned inside one another, the internal ridges lie in the pathways of the external ridges. The external ridges are in fluid-tight, sliding engagement with the sidewalls of the carrier conduit and coaxial conduits. The carrier conduit and coaxial conduit are constructed of a flexible material, such as rubber or the like. The ridges are suitably reinforced with wire or other similar material, (FIG. 2). The conduits may also be formed by reinforced, flexible material, such as reinforced rubber or the like.

Referring to FIG. 1, the draining apparatus 10 includes sealing apparatus 72 disposed in the annulus 25 between the guide housing 20 and carrier conduit 48. The sealing apparatus includes a ring element 74 which is connected to the sidewalls 22 of the guide housing 20 and has an external surface which is the connecting surface and an internal surface having a groove 76. An annular seal 78 made of any suitable material, such as rubber or the like, is positioned within the groove. Where the stop element opening (not shown) replaces the opening 58 on the sidewall of the carrier conduit 48, then the sealing apparatus 72 is replaced by an air space (not shown).

The carrier conduit 48 is movable relative to the guide housing 20 between a first nesting position and a second extended position. In the nesting position, the stop element 56 is spaced from the ring element 74 and the side opening 24 of the guide housing 20 and carrier conduit opening 58 are free from fluid communication. In the extended position, shown by broken lines in FIG. 1, the stop element 56 is in contact with the ring element 74 and the side opening 24 of the guide housing 20 and carrier conduit opening 58 are in fluid communication. In the extended position, the coaxial conduits 62 are extended.

OPERATION

While the operation of the present invention is believed clearly apparent from the foregoing description, further amplification will subsequently be made in the following brief summary of such operation.

To remove the fluid 18 from the reservoir 12, the drain plug 36 is removed allowing access to the coaxial conduit 62 which is in the first, nesting position inside the carrier conduit 48. The coaxial conduit is extended as desired and the adapter 38 is loosened. When the carrier conduit is moved from the nesting position to the second extended position, the fluid is free to flow from the reservoir. The flow can be stopped at any time by pushing the carrier conduit back into the guide housing 20 a few inches toward the nesting position.

The flow may be started or stopped in this manner at any time as long as the fluid level remains above the opening 24 in the guide housing. When the level drops below the opening, the fluid remaining is siphoned through the ducts 26 and 28. Once started at any level, the flow will continue until the reservoir is evacuated.

The carrier conduit 48 and coaxial conduits 62 remain relatively clean and oil free because of the annular seal 78 and collar seals 42. When the reservoir 12 is empty, the conduits are returned to the nesting position and the adapter 38 and drain plug 36 are replaced.

Other aspects, objects and advantages will become apparent from a study of the specification, drawings, and appended claims.

The embodiments of the invention in which an exclusive property or privilege is claimed are defined as follows:

1. Draining apparatus for a fluid reservoir having an opening and a chamber comprising:
    a guide housing having a bottom portion, a closed top, sidewalls and an opening in the sidewall and being positioned about said reservoir opening with the reservoir opening and the guide housing sidewall opening in fluid communication;
    a dividing element having an internal surface defining a circular opening and being connected to the sidewalls of the guide housing at a higher elevation than the sidewall opening of the guide housing, said dividing element dividing the guide housing into a first fluid receiving chamber defined by said dividing element, the bottom and the sidewalls and a second chamber defined by said dividing element, the closed top and sidewalls of the guide housing and which is substantially free of fluid;
    a carrier conduit having first and second end portions, a sidewall extending between the end portions, and an opening in the sidewall, and extending through the dividing element opening and being extendable through the guide housing to a location sufficient for passing fluid from the reservoir chamber through said second end portion;
    seal means for blocking fluid flow between said internal surface of the dividing element and the carrier conduit; and
    a stop element positioned on and closing the first end portion of the carrier conduit, said carrier conduit being movable relative to the guide housing between a first position at which the carrier conduit sidewall opening is within the second guide housing chamber and free from fluid communication with the reservoir chamber and a second position at which the carrier conduit extends to said fluid passing location and the carrier conduit sidewall opening is within the first guide housing chamber and in fluid communication with the reservoir chamber, said stop element abutting the dividing element at the second position at a location sufficient for automatically positioning the carrier conduit sidewall opening adjacent the bottom of the guide housing.

2. An apparatus, as set forth in claim 1, including a duct being positioned in the sidewall opening of the guide housing and extending into said reservoir chamber to a location adjacent the bottom of said reservoir.

3. An apparatus, as set forth in claim 1, wherein the guide housing is attached to the reservoir.

* * * * *